United States Patent
Kim et al.

(10) Patent No.: US 11,148,229 B2
(45) Date of Patent: Oct. 19, 2021

(54) LASER PROCESSING APPARATUS INCLUDING A SUPPLY NOZZLE AND A SUCTION STRUCTURE OVER A STAGE

(71) Applicant: Samsung Display Co., Ltd., Yongin-si (KR)

(72) Inventors: Do-sun Kim, Seoul (KR); Taekkyo Kang, Suwon-si (KR); Seungho Myoung, Hwaseong-si (KR); Minkyu Choi, Asan-si (KR); Gyoowan Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 273 days.

(21) Appl. No.: 16/177,049

(22) Filed: Oct. 31, 2018

(65) Prior Publication Data

US 2019/0126405 A1    May 2, 2019

(30) Foreign Application Priority Data

Oct. 31, 2017   (KR) .................... 10-2017-0144171

(51) Int. Cl.
*B23K 26/28*    (2014.01)
*B23K 26/38*    (2014.01)
(Continued)

(52) U.S. Cl.
CPC .............. *B23K 26/38* (2013.01); *B08B 5/02* (2013.01); *B08B 15/04* (2013.01); *B23K 26/142* (2015.10);
(Continued)

(58) Field of Classification Search
CPC ...... B23K 26/14; B23K 26/16; B23K 26/142; B23K 26/38; B23K 26/342;
(Continued)

(56) References Cited

U.S. PATENT DOCUMENTS 7,692,115 B2   4/2010   Sasaki et al.
8,207,472 B2   6/2012   Kosmowski
(Continued)

FOREIGN PATENT DOCUMENTS

CN   101172321 A   5/2008
CN   102066039 A   5/2011
(Continued)

OTHER PUBLICATIONS

Chinese Examination Report from corresponding Chinese Patent Application No. 201811285146.X, Chinese Examination Report dated Jun. 30, 2021 (8 pgs.).

*Primary Examiner* — Dana Ross
*Assistant Examiner* — Adam Michael Eckardt
(74) *Attorney, Agent, or Firm* — Lewis Roca Rothgerber Christie LLP

(57) ABSTRACT

A laser processing apparatus may include: a laser generator configured to generate a laser beam; a stage configured to support a target object; at least one supply nozzle on the stage to eject an air toward the stage; a suction unit configured to inhale external air; and a suction structure on the stage and adjacent to the at least one supply nozzle. The suction structure may include a suction hole connected to the suction unit to inhale the external air. The suction structure may include an inclined surface in which the suction hole is defined. The suction structure may include a first surface adjacent to the supply nozzle, and an opening may be defined in a region of the first surface adjacent to a bottom surface. A distance between the inclined surface and the target object may be less than or equal to a height of the opening.

20 Claims, 9 Drawing Sheets

(51) Int. Cl.
  *B23K 26/14* (2014.01)
  *B08B 15/04* (2006.01)
  *B23K 26/142* (2014.01)
  *B23K 26/361* (2014.01)
  *B08B 5/02* (2006.01)
  *B23K 103/00* (2006.01)
  *B23K 26/70* (2014.01)

(52) U.S. Cl.
  CPC ........ *B23K 26/147* (2013.01); *B23K 26/1476* (2013.01); *B23K 26/361* (2015.10); *B23K 26/702* (2015.10); *B23K 2103/50* (2018.08)

(58) Field of Classification Search
  CPC .............. B23K 2103/50; B23K 26/147; B23K 26/1476; B23K 26/361; B23K 26/702; C08F 212/08; C08F 214/06; C08F 220/18; C08F 220/20; C08F 220/26; C08F 220/28; C08F 220/282; C08F 2800/20; C08F 218/08; C08F 220/44; C08L 2201/54; C08L 2205/025; C08L 2205/14; C08L 27/06; C08L 29/04; B08B 15/04; B08B 5/02; C08K 5/00
  See application file for complete search history.

(56) References Cited

U.S. PATENT DOCUMENTS

| | | | |
|---|---|---|---|
| 9,259,802 B2 | 2/2016 | Willey et al. | |
| 9,700,960 B2 | 7/2017 | Jeong et al. | |
| 10,005,155 B2* | 6/2018 | Moon | B23K 26/142 |
| 10,780,634 B2* | 9/2020 | Ohno | B29C 64/153 |
| 2002/0191163 A1* | 12/2002 | Hasegawa | G03F 7/70933 355/30 |
| 2002/0191166 A1* | 12/2002 | Hasegawa | G03F 7/70933 355/53 |
| 2003/0226834 A1* | 12/2003 | Ishikawa | B23K 26/0604 219/121.77 |
| 2004/0197433 A1 | 10/2004 | Terada et al. | |
| 2005/0066830 A1 | 3/2005 | Miyagawa et al. | |
| 2007/0145026 A1* | 6/2007 | Murase | B23K 26/16 219/121.84 |
| 2009/0223944 A1* | 9/2009 | Sukhman | B23K 26/364 219/121.84 |
| 2011/0114610 A1 | 5/2011 | Szelagowski et al. | |
| 2013/0001206 A1* | 1/2013 | Yamamoto | B23K 26/14 219/121.72 |
| 2016/0129527 A1* | 5/2016 | Moon | B23K 26/38 425/174.4 |
| 2017/0106471 A1 | 4/2017 | Yoshii et al. | |
| 2017/0252864 A1* | 9/2017 | Oberholzer | B08B 15/04 |
| 2018/0198253 A1* | 7/2018 | Miyamoto | H01S 3/08004 |
| 2018/0315627 A1* | 11/2018 | Ito | B23K 26/354 |
| 2018/0337510 A1* | 11/2018 | Koura | H01S 3/104 |
| 2018/0345416 A1* | 12/2018 | Zhu | B23K 26/142 |
| 2019/0143382 A1* | 5/2019 | Johnson | B23K 26/402 219/121.68 |
| 2019/0217414 A1* | 7/2019 | Hong | B23K 26/142 |
| 2020/0219722 A1* | 7/2020 | Randhawa | H01L 21/68764 |
| 2020/0246919 A1* | 8/2020 | Chen | B23K 26/083 |
| 2020/0298338 A1* | 9/2020 | Reisacher | B29C 64/357 |
| 2021/0043443 A1* | 2/2021 | Chou | B08B 3/10 |

FOREIGN PATENT DOCUMENTS

| | | | |
|---|---|---|---|
| CN | 102112267 A | | 6/2011 |
| CN | 103722292 A | | 4/2014 |
| CN | 106583931 A | | 4/2017 |
| CN | 111482699 A | * | 4/2020 |
| JP | H 02247097 A | | 10/1990 |
| JP | H 10-099978 A | | 4/1998 |
| JP | H 10113786 A | | 5/1998 |
| JP | 3869358 B2 | | 1/2007 |
| JP | 2011-512256 A | | 4/2011 |
| JP | 2014-024117 A | | 2/2014 |
| JP | 3195668 U | | 1/2015 |
| KR | 10-2008-0001428 A | | 1/2008 |
| KR | 10-2011-0062886 A | | 6/2011 |
| KR | 10-1514944 B1 | | 4/2015 |
| KR | 10-1552562 B1 | | 9/2015 |

* cited by examiner

FIG. 4
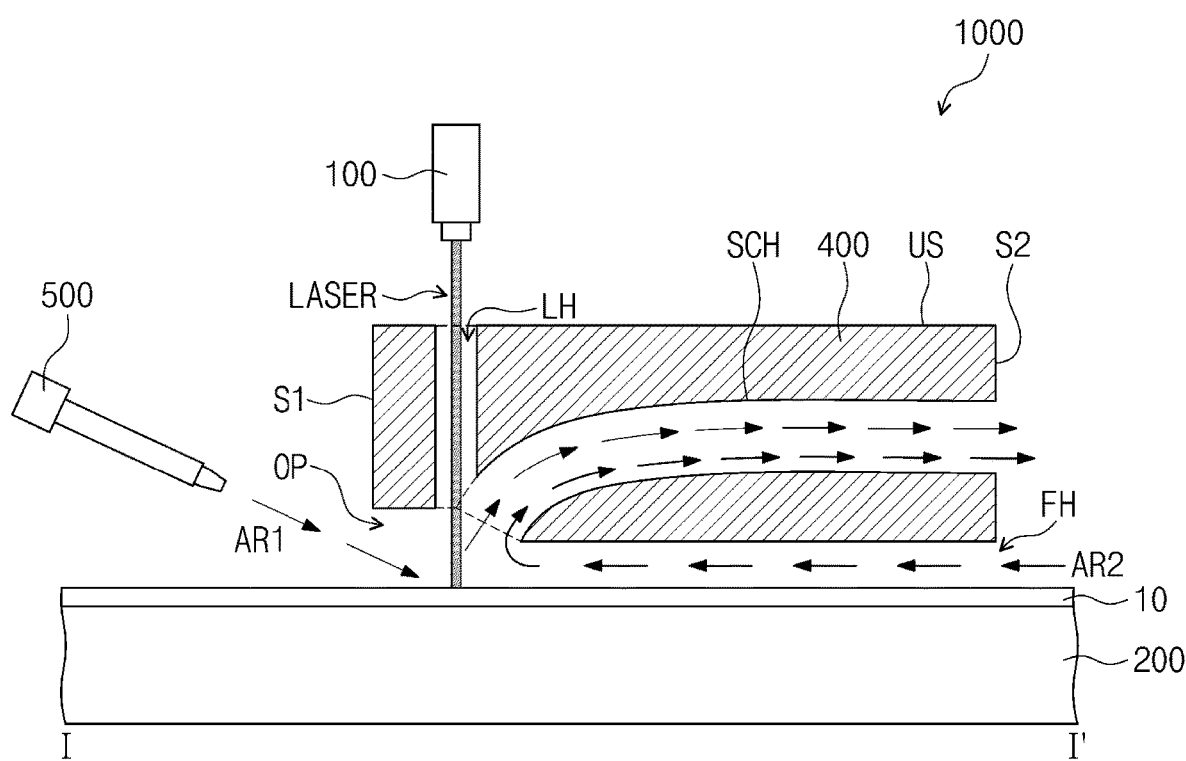
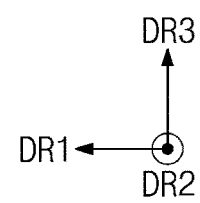

FIG. 5
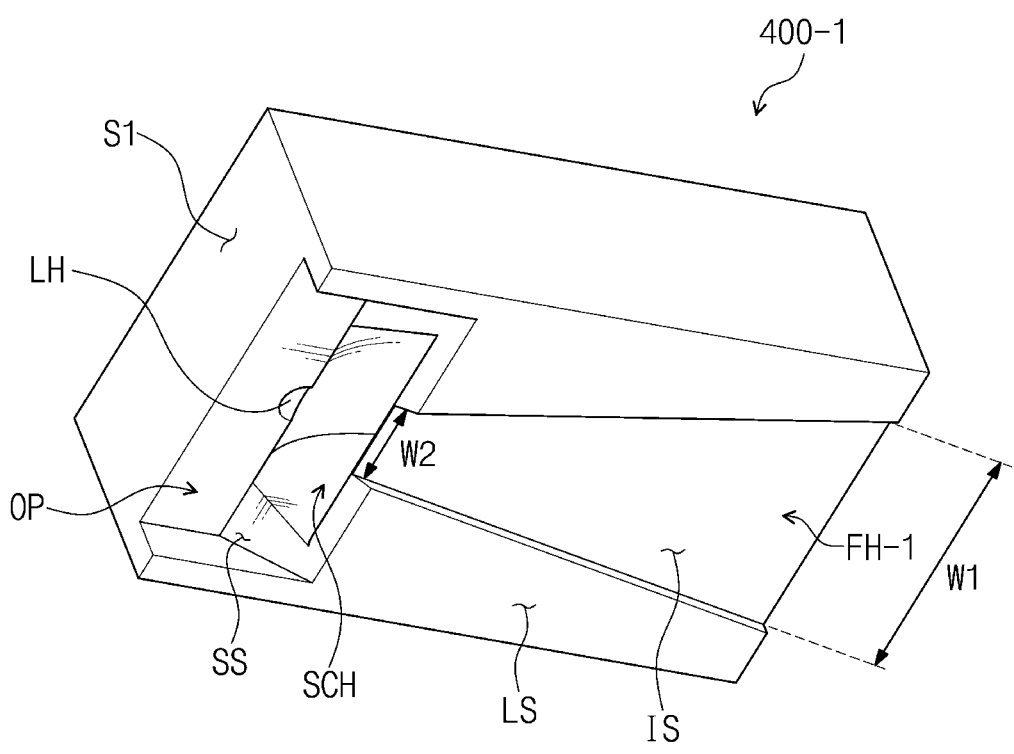
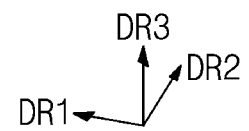

FIG. 6
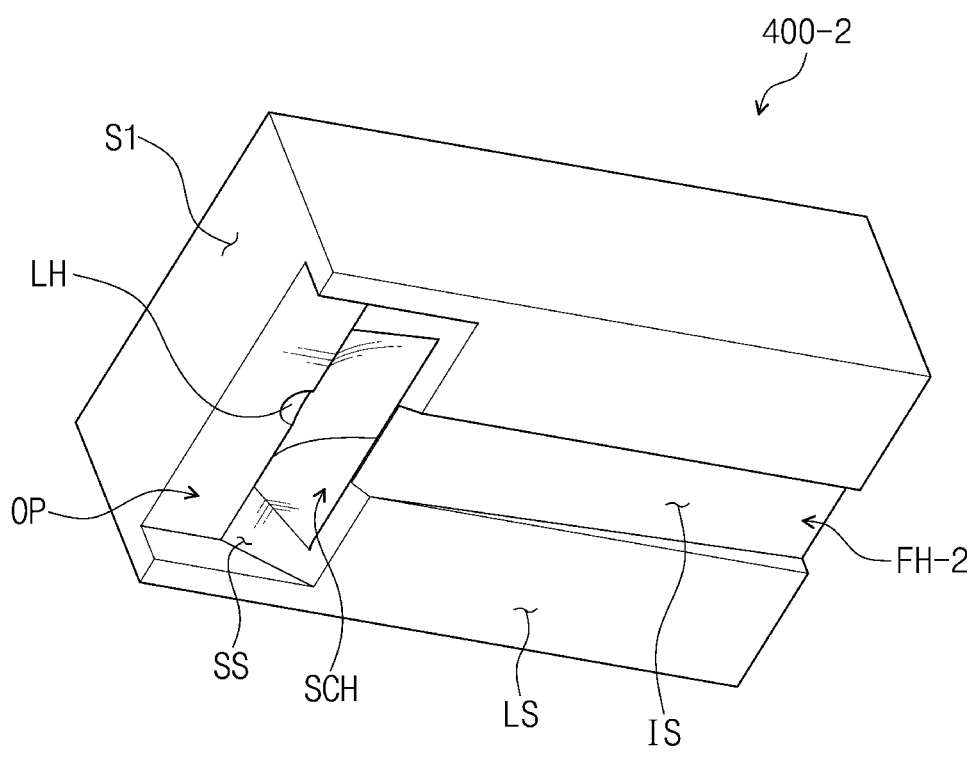
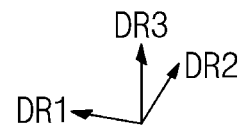

LASER PROCESSING APPARATUS INCLUDING A SUPPLY NOZZLE AND A SUCTION STRUCTURE OVER A STAGE

CROSS-REFERENCE TO RELATED APPLICATION

This application claims priority to and the benefit of Korean Patent Application No. 10-2017-0144171, filed on Oct. 31, 2017 in the Korean Intellectual Property Office, the entire content of which is hereby incorporated by reference.

BACKGROUND

1. Field

Aspects of embodiments of the present disclosure relate to a laser processing apparatus.

2. Description of the Related Art

A laser processing apparatus is configured to irradiate a laser beam, which is emitted from a light source, onto a target object through an optical system, and is used to perform various laser beam exposing processes (e.g., marking, exposing, etching, punching, scribing, and dicing processes) on a target object. In the case in which the dicing process is performed to cut a target object, a contamination material (e.g., a fume) may be produced from the target object.

SUMMARY

According to an aspect of one or more embodiments of the inventive concept, a laser processing apparatus has improved reliability.

According to one or more embodiments of the inventive concept, a laser processing apparatus may include: a laser generator configured to generate a laser beam; a stage configured to support a target object thereon; at least one supply nozzle over the stage to eject air toward the stage; a suction unit configured to inhale external air; and a suction structure over the stage and adjacent to the at least one supply nozzle, the suction structure having a suction hole, which is connected to the suction unit and through which the external air is inhaled. The suction structure may include a bottom surface adjacent to the stage, the bottom surface including an inclined surface, in which the suction hole is defined, a top surface facing the bottom surface, and a plurality of side surfaces connecting the bottom surface to the top surface. The plurality of side surfaces may include a first surface adjacent to the supply nozzle, an opening may be defined in a region of the first surface adjacent to the bottom surface, and a distance between the inclined surface and the target object may be less than or equal to a height of the opening.

In one or more embodiments, the inclined surface may be inclined at a first angle relative to a top surface of the stage.

In one or more embodiments, the opening may be connected to the bottom surface, and the supply nozzle may be arranged to face the opening and may be inclined at a second angle relative to the top surface of the stage.

In one or more embodiments, the laser processing apparatus may further include an angle adjusting unit connected to the supply nozzle and configured to adjust the second angle.

In one or more embodiments, the angle adjusting unit may be connected to the suction structure by a hinge.

In one or more embodiments, the first angle may be equal to the second angle.

In one or more embodiments, the suction structure may define a processing hole extending from the top surface toward the stage, and the laser generator may be configured to generate the laser beam to propagate through the processing hole.

In one or more embodiments, the processing hole and the suction hole may be connected to each other.

In one or more embodiments, the processing hole may be between the opening and the suction hole.

In one or more embodiments, the plurality of side surfaces may further include a second surface facing the first surface in a first direction, and the suction structure may be arranged to define an inflow groove, which is recessed from the bottom surface toward the top surface and is extended from the second surface toward the first surface to connect the second surface to the inclined surface.

In one or more embodiments, a distance between an inner side surface of the inflow groove and the target object may be from about 100 µm to 1000 µm.

In one or more embodiments, the inflow groove may have a tetragonal or rectangular shape, when viewed in a plan view relative to the stage.

In one or more embodiments, a width of the inflow groove may decrease with increasing distance from the second surface in the first direction.

In one or more embodiments, a depth of the inflow groove may decrease with increasing distance from the second surface in the first direction.

In one or more embodiments, the laser processing apparatus may further include a guiding nozzle, which is arranged on the stage to face the supply nozzle with the suction structure therebetween and is configured to eject air toward the stage. The guiding nozzle may be provided to face the inflow groove and may be inclined at an angle relative to a top surface of the stage.

In one or more embodiments, a distance between the opening and the stage may be larger than a distance between an inner side surface of the inflow groove and the stage.

In one or more embodiments, the laser generator, the suction structure, and the supply nozzle may be configured to move together over the stage.

In one or more embodiments, the first angle may be from about 15° to 60°.

In one or more embodiments, a cross-sectional area of the suction hole may increase in a direction from the inclined surface toward the suction unit.

According to one or more embodiments of the inventive concept, a laser processing apparatus may include a stage configured to support a target object thereon, a laser generator configured to irradiate a laser beam toward the stage, a supply nozzle over the stage and configured to eject air toward the stage, and a suction structure over the stage and adjacent to the supply nozzle, the suction structure having a suction hole through which external air is inhaled. An entrance of the suction hole may be inclined at an angle relative to a top surface of the stage.

BRIEF DESCRIPTION OF THE DRAWINGS

Example embodiments will be more clearly understood from the following brief description taken in conjunction

FIG. 4 is a diagram illustrating an air flow in a laser processing apparatus according to one or more embodiments of the inventive concept.

FIG. 5 is a perspective view illustrating a bottom surface of a suction structure according to one or more embodiments of the inventive concept.

FIG. 6 is a perspective view illustrating a bottom surface of a suction structure according to one or more embodiments of the inventive concept.

Figure 1:
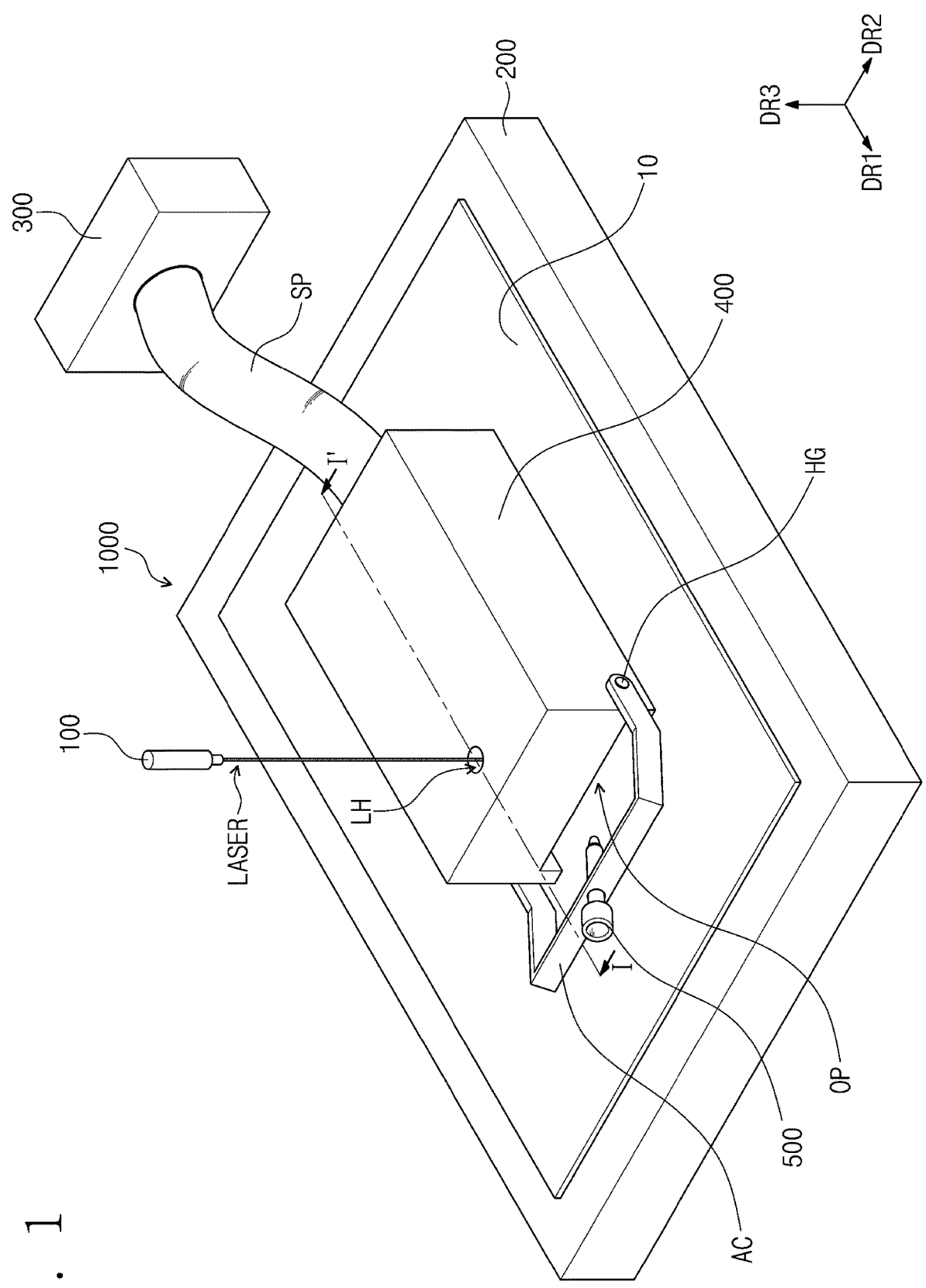
FIG. 1 is a perspective view illustrating a laser processing apparatus according to one or more embodiments of the inventive concept.

These figures are intended to illustrate general characteristics of methods, structures, and/or materials utilized in certain example embodiments and to supplement the written description provided below. These drawings may not, however, be to scale and may not precisely reflect the precise structural or performance characteristics of any given embodiment, and should not be interpreted as defining or limiting the range of values or properties encompassed by example embodiments. For example, relative thicknesses and positioning of components, layers, regions, and/or structural elements may be reduced or exaggerated for clarity. The use of similar or same reference numbers in the various drawings is intended to indicate the presence of a similar or same element or feature.

DETAILED DESCRIPTION

Some example embodiments of the inventive concept will be described more fully with reference to the accompanying drawings, in which some example embodiments are shown. Embodiments of the inventive concept may, however, be embodied in many different forms and should not be construed as being limited to the example embodiments set forth herein; rather, these example embodiments are provided so that this disclosure will be thorough and complete, and will fully convey the inventive concept to those of ordinary skill in the art. In the drawings, thicknesses of layers and regions may be exaggerated for clarity. Like reference numerals in the drawings denote like elements, and thus their repeated description may be omitted.

It is to be understood that when an element is referred to as being "connected" or "coupled" to another element, it may be directly connected or coupled to the other element or one or more intervening elements may be present. In contrast, when an element is referred to as being "directly connected" or "directly coupled" to another element, there are no intervening elements present. Like numbers indicate like elements throughout. As used herein, the term "and/or" includes any and all combinations of one or more of the associated listed items. Other words used to describe the relationship between elements or layers should be interpreted in a like fashion (e.g., "between" versus "directly between," "adjacent" versus "directly adjacent," and "on" versus "directly on").

It is to be understood that, although the terms "first," "second," etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a "first" element, component, region, layer, or section discussed below could be termed a "second" element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

The terminology used herein is for the purpose of describing particular embodiments and is not intended to be limiting of example embodiments. As used herein, the singular forms "a," "an," and "the" are intended to include the plural forms as well, unless the context clearly indicates otherwise. It is to be further understood that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Some example embodiments of the inventive concept are described herein with reference to cross-sectional illustrations that are schematic illustrations of idealized embodiments (and intermediate structures) of example embodiments. As such, variations from the shapes shown in the illustrations as a result, for example, of manufacturing techniques and/or tolerances, are to be expected. Thus, embodiments of the inventive concept should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and are not to be interpreted in an idealized or overly formal sense unless expressly so defined herein.

Figure 2:
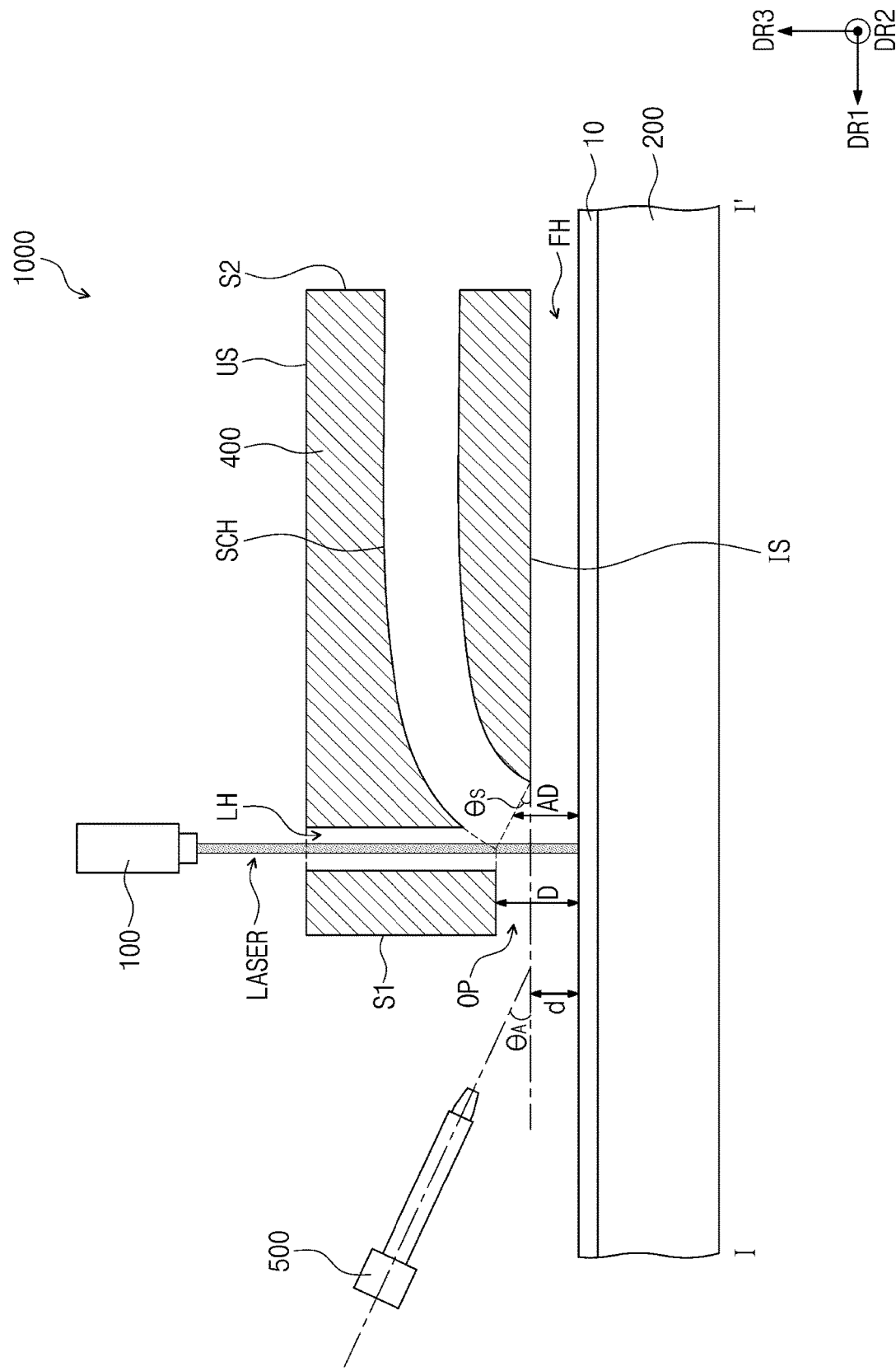
FIG. 2 is a cross-sectional view taken along the line I-I' of FIG. 1.

FIG. 1 is a perspective view illustrating a laser processing apparatus according to one or more embodiments of the inventive concept; and FIG. 2 is a cross-sectional view taken along the line I-I' of FIG. 1.

A laser processing apparatus 1000, according to one or more embodiments of the inventive concept, may be used for marking, cutting, etching, and punching processes, for example. For example, the laser processing apparatus 1000 may be configured to irradiate a laser beam LASER onto a target object 10, and this process may be used to form a cutting line and a guide line in the target object 10 or to cut at least a portion of the target object 10, for example. An example in which the laser processing apparatus 1000 is used to cut, etch, or pattern a metal-containing target object, and thereby to fabricate a metal mask, will be described with reference to the drawings. However, a use of the laser processing apparatus 1000 is not limited to a specific process. That is, depending on a kind or usage of a target object, the laser processing apparatus 1000 may be used for any of various processes.

Referring to FIGS. 1 and 2, according to one or more embodiments, the laser processing apparatus 1000 may include a laser generator 100, a stage 200, a suction unit 300, a suction structure 400, and a supply nozzle 500.

The laser generator 100 may be configured to generate the laser beam LASER. For example, the laser generator 100 may be configured to generate an excimer laser, a solid laser, or the like. In an embodiment, one laser generator 100 may be provided, as shown in FIGS. 1 and 2, but the inventive concept is not limited to any particular number of the laser generator 100. In certain embodiments, the laser processing apparatus 1000 may be configured to include a plurality of the laser generators 100.

The stage 200 may be configured to provide a flat surface. For example, the stage 200 may have a flat surface that is parallel to a plane defined by a first direction DR1 and a second direction DR2 crossing each other.

The target object 10 may be loaded or supported on the stage 200. In the present embodiment, the target object 10 may be a thin metal layer. The laser beam LASER generated by the laser generator 100 may be irradiated onto the target object 10 loaded or supported on the stage 200. The target object 10 may be cut or etched by the laser beam LASER. In an embodiment, a fine metal mask (FMM) may be formed as a result of the cutting or etching process on the target object 10.

Herein, for convenience in description, an irradiation direction of the laser beam LASER in the laser processing apparatus 1000 will be referred to as a downward direction, and a direction opposite to the downward direction will be referred to as an upward direction. In the present embodiment, the upward and downward directions may be parallel to a third direction DR3 that is orthogonal to both of the first direction DR1 and the second direction DR2. Top and bottom surfaces of each of elements to be described below will be differentiated based on the third direction DR3. However, the upward and downward directions may be a relative concept, and, in certain embodiments, they may be used to indicate other directions.

The suction structure 400 may be provided on the stage 200. The target object 10 may be provided between the suction structure 400 and the stage 200. In the present embodiment, the suction structure 400 may be shaped like a three-dimensional housing. In an embodiment, the suction structure 400 may be shaped like a rectangular parallelepiped. However, the inventive concept is not limited to a specific shape of the suction structure 400. Herein, an example in which the suction structure 400 has a rectangular parallelepiped shape will be exemplarily described below.

The suction structure 400 may be connected to the suction unit 300. In one or more embodiments, the laser processing apparatus 1000 may further include a suction pipe SP connecting the suction structure 400 and the suction unit 300 to each other. However, in one or more embodiments, the suction pipe SP may be omitted.

The suction unit 300 may be configured to produce a suction force, and the suction force of the suction unit 300 may be used to inhale external air. The suction structure 400 may be configured to guide a guiding air flow and may be used to deliver the air to the suction unit 300. In the present embodiment, a fluid velocity of the air inhaled by the suction unit 300 may be in a range from about 30 m/s to 100 m/s. The fluid velocity may be an instantaneous velocity of the air inhaled by the suction unit 300.

The supply nozzle 500 may be provided above the stage 200. The target object 10 may be provided below the supply nozzle 500. The supply nozzle 500 may be provided adjacent to the suction structure 400. For example, the supply nozzle 500 may be provided at a side of the suction structure 400 in the first direction DR1.

The supply nozzle 500 may be configured to eject or spray the air. Although not shown, the supply nozzle 500 may be connected to an air supplying part (not shown). The air supplied from the air supplying part may be ejected or sprayed toward the stage 200 through the supply nozzle 500. In the present embodiment, a fluid velocity of the air ejected from the supply nozzle 500 may be in a range from about 70 m/s to 200 m/s. The fluid velocity may be an instantaneous velocity of the air ejected through the supply nozzle 500.

Although one supply nozzle 500 is illustrated in the drawings, the inventive concept is not limited to a particular number of the supply nozzle 500. For example, in one or more embodiments, the laser processing apparatus may be configured to include a plurality of supply nozzles 500.

In one or more embodiments, the laser generator 100, the suction structure 400, and the supply nozzle 500 may be configured to move together on the stage 200. In one or more embodiments, although not shown, the laser generator 100, the suction structure 400, and the supply nozzle 500 may be connected to each other, thereby constituting a single coupled object, and the laser processing apparatus may further include a driving part (not shown) that is used to move the single coupled object on the stage 200.

Herein, the suction structure 400 and the supply nozzle 500 will be described in more detail below.

Figure 3:
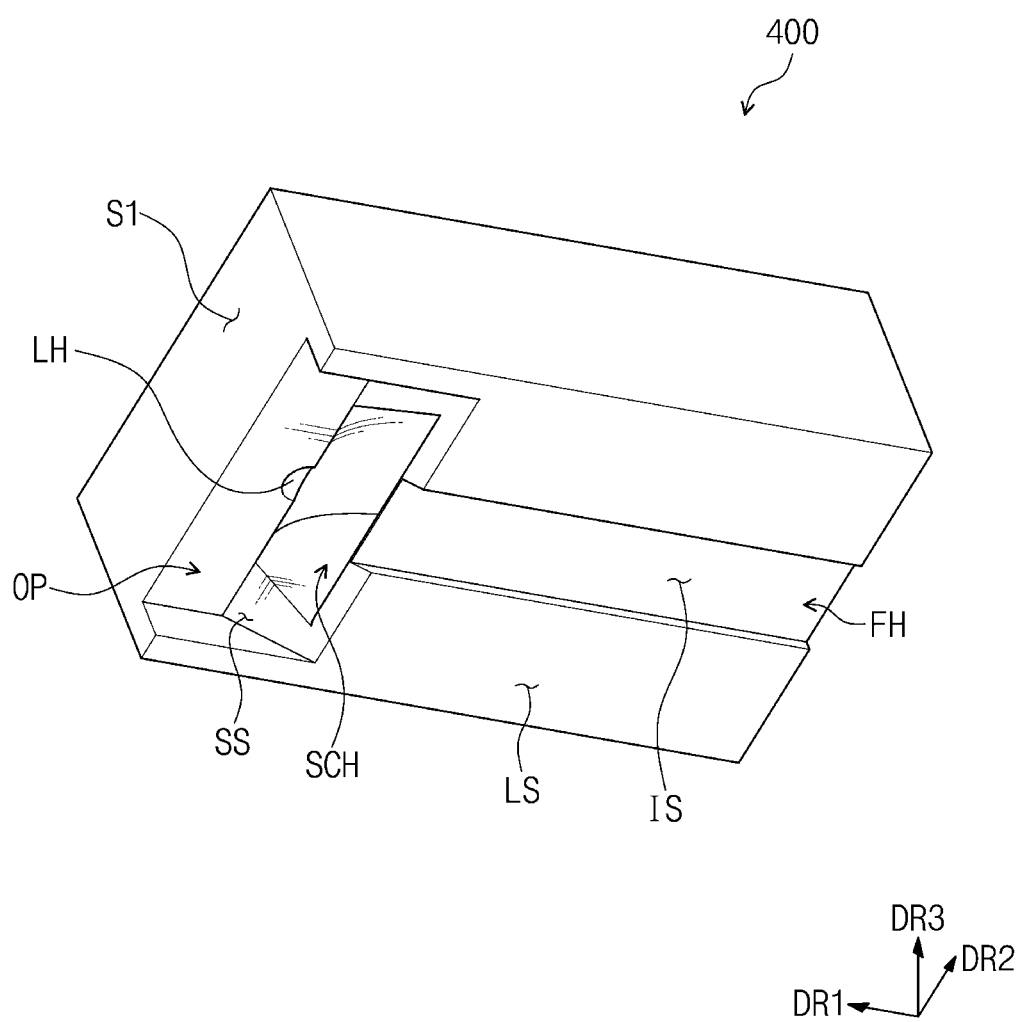
FIG. 3 is a perspective view illustrating a bottom surface of a suction structure of the laser processing apparatus of FIG. 1.

FIG. 3 is a perspective view illustrating a bottom surface of the suction structure of FIG. 1.

Referring further to FIG. 3, the suction structure 400 may include a top surface US, a bottom surface LS, and a plurality of side surfaces S1 and S2.

The top surface US and the bottom surface LS may face each other in the third direction DR3. The top surface US may be located between the bottom surface LS and the laser generator 100. The bottom surface LS may be located between the top surface US and the stage 200.

The plurality of side surfaces S1 and S2 may connect the top surface US to the bottom surface LS. The plurality of side surfaces S1 and S2 may include a first surface S1 and a second surface S2, which face each other in the first direction DR1. The first surface S1 and the second surface S2 may be two side surfaces of the suction structure 400 facing each other in the first direction DR1.

In one or more embodiments, an opening OP may be defined through a lower portion of the first surface S1. An inner side surface of the opening OP may be connected to the bottom surface LS. A height of the opening OP may be a first height D.

The bottom surface LS may include an inclined surface SS that is inclined at a first angle $\theta_S$ relative to a top surface of the stage 200. In the present embodiment, the first angle $\theta_S$ may be in a range from about 15° to 60°. The inclined surface SS may be defined in a side region of the bottom surface LS, when viewed in the first direction DR1.

In one or more embodiments, a suction hole SCH may be defined through the inclined surface SS. In other words, the entrance of the suction hole SCH may be formed to be coplanar with the inclined surface SS. The suction hole SCH may be curvedly extended from the inclined surface SS to penetrate the second surface S2. The suction pipe SP may be connected to an opposite end of the suction hole SCH, which is formed through the second surface S2. In the present embodiment, a width of the suction hole SCH in the third direction DR3 may be in a range from about 15 mm to 60 mm.

In the present embodiment, a distance between the inclined surface SS and the target object 10 (or the bottom surface LS in the third direction DR3) may be less than or equal to the first height D. In other words, an average distance AD between the inclined surface SS and the target object 10 (or the bottom surface LS in the third direction DR3) may be less than the first height D.

In one or more embodiments, a processing hole LH may be defined in the top surface US. The processing hole LH may extend in the third direction DR3 and may penetrate the top surface US and the bottom surface LS. The laser beam LASER generated by the laser generator 100 may be irradiated onto the stage 200 through the processing hole LH.

The processing hole LH may be provided between the suction hole SCH and the opening OP.

In one or more embodiments, on the bottom surface LS, the processing hole LH may be overlapped with a portion of the suction hole SCH. In other words, the processing hole LH and the suction hole SCH may be coupled to or combined with each other in an internal space of the suction structure 400 adjacent to the bottom surface LS, thereby forming a coupled space. The coupled space may be divided into two regions, which are extended toward the top surface US and the second surface S2, respectively.

As shown in FIGS. 2 and 3, in the internal space of the suction structure 400 adjacent to the bottom surface LS, the processing hole LH and the suction hole SCH may be connected to each other to form the coupled space, but the inventive concept is not limited thereto. For example, in certain embodiments, the suction structure 400 may be configured to have the processing hole LH and the suction hole SCH that are spaced apart from each other.

Although not shown, in one or more embodiments, the laser processing apparatus 1000 may include at least one optical device (not shown) provided in the processing hole LH. For example, the optical device (not shown) may include at least one of a lens, a filter, or an optical film. The optical device (not shown) in the processing hole LH may be configured to change optical characteristics of the laser beam LASER, when the laser beam LASER passes through the optical device.

In one or more embodiments, an inflow groove FH may be defined in the bottom surface LS. The inflow groove FH may be an empty region, which is recessed in a direction from the bottom surface LS toward the top surface US and has an inner side surface IS. The inflow groove FH may have a shape extending in a direction from the second surface S2 toward the first surface S1. In the present embodiment, the inflow groove FH may have a tetragonal or rectangular shape, when viewed in a plan view relative to the top surface of the stage 200.

The inflow groove FH may connect the second surface S2 to the inclined surface SS. In other words, the inner side surface IS of the inflow groove FH may be connected to the inclined surface SS.

A depth d of the inflow groove FH may be defined as a distance between the inner side surface IS of the inflow groove FH and the target object 10 (or the bottom surface LS in the third direction DR3), and in the present embodiments, the depth d of the inflow groove FH may be in a range from about 100 μm to 500 μm. In an embodiment, the depth d of the inflow groove FH may be equal (i.e. equal or substantially equal) to a distance between the target object 10 (or the bottom surface LS in the third direction DR3) and the lowermost portion of the suction hole SCH defined in the inclined surface SS.

The supply nozzle 500 may be provided at a side of the suction structure 400 in the first direction DR1. The supply nozzle 500 may be configured to eject the air toward the opening OP. The air ejected from the supply nozzle 500 may be supplied into the suction structure 400 through the opening OP.

The supply nozzle 500 may be provided to be inclined at a second angle $\theta_A$ relative to the top surface of the stage 200. In an embodiment, the second angle $\theta_A$ may be equal (i.e. equal or substantially equal) to the first angle $\theta_S$.

In one or more embodiments, the laser processing apparatus 1000 may further include an angle adjusting unit AC. The angle adjusting unit AC may be connected to the supply nozzle 500 and may be used to adjust the second angle $\theta_A$. For example, the angle adjusting unit AC may include a rod-shaped structure fastening the supply nozzle 500 and may be connected to the suction structure 400 by hinges HG. Here, the hinges HG may be coupled to side surfaces of the suction structure 400 other than the first and second surfaces S1 and S2, and may be used to rotate the rod-shaped structure and thereby to change an angle of the supply nozzle 500 relative to the top surface of the stage 200.

In the present embodiment, the angle adjusting unit AC may be fixed to the suction structure 400, but the inventive concept is not limited thereto. For example, in another embodiment, the angle adjusting unit AC may not be connected to the suction structure 400 and may be configured to independently adjust a position and an angle of the supply nozzle 500.

In an embodiment, the angle adjusting unit AC may be merely used as a connection member. For example, the hinge HG may not be used to rotate the angle adjusting unit AC.

FIG. 4 is a diagram illustrating an air flow in a laser processing apparatus according to one or more embodiments of the inventive concept.

Referring to FIG. 4, the suction unit 300 (e.g., see FIG. 1) may exert a suction force on the suction structure 400, and the supply nozzle 500 may eject first air AR1 toward the opening OP. The first air AR1 may be supplied into the suction structure 400 through the opening OP and may be exhausted through the suction hole SCH by the suction force. In other words, a guiding air flow may be formed in a direction from the opening OP toward the suction unit 300 (e.g., see FIG. 1).

Further, due to the suction force, external air AR2 may be supplied into the suction structure 400 through the inflow groove FH. The external air AR2 in the suction structure 400 may be exhausted through the suction hole SCH. In other words, a guiding air flow may be formed in a direction from the inflow groove FH toward the suction unit 300 (e.g., see FIG. 1).

In general, when the target object 10 is cut or etched by the laser beam LASER, a contamination material and splinters of the target object 10 may be produced. In a case in which the contamination material and the splinters are not removed, the target object 10 may suffer from a large processing error.

In embodiments of the inventive concept, the contamination material and the splinters may be exhausted to the suction unit 300 (e.g., see FIG. 1) by the guiding air flow. Thus, it is possible to effectively remove the contamination material and the splinters which may occur when the target object 10 is processed. In the present embodiment, the fluid velocity of the guiding air flow may be larger than or equal to 60 m/s.

In one or more embodiments, a distance between the target object 10 (or the bottom surface LS in the third direction DR3) and the suction hole SCH defined in the inclined surface SS may be less than or equal to the distance D (e.g., see FIG. 2) between the opening OP and the target object 10 (or the bottom surface LS in the third direction DR3). Thus, the first air AR1 supplied into the opening OP may be exhausted to the suction hole SCH without formation of a vortex.

In the present embodiment, the depth d of the inflow groove FH (i.e. a distance between the inner side surface IS of the inflow groove FH and the target object 10 (or the bottom surface LS in the third direction DR3)) may be in a range from about 100 μm to 1000 μm. In a case in which the distance d is less than 100 μm, the external air AR2 supplied through the inflow groove FH may be weaker than the guiding air flow, which is produced by the first air AR1 supplied through the opening OP, and, in this case, a vortex may be formed in the suction structure 400. By contrast, in a case in which the distance d is larger than 1000 μm, a magnitude of the suction force exerted on the suction structure 400 may be small. In the present embodiment, the distance d may be equal to the shortest distance between the suction hole SCH and the target object 10 (or the bottom surface LS in the third direction DR3).

As a result, according to embodiments of the inventive concept, it is possible to effectively remove a contamination material and splinters which may be produced when a process using a laser beam is performed, and thereby to improve reliability of the laser processing apparatus 1000.

FIG. 5 is a perspective view illustrating a bottom surface of a suction structure according to one or more embodiments of the inventive concept.

For concise description, a previously described element may be identified by a similar or same reference number without repeating an overlapping description thereof. Other elements that are not separately described may be configured to have substantially the same technical features as those in the previously described embodiments.

Referring to FIG. 5, an inflow groove FH-1 of a suction structure 400-1 according to one or more embodiments of the inventive concept may have a trapezoid shape, when viewed in a plan view relative to the top surface of the stage 200. In an embodiment, the inflow groove FH-1 may be provided to have a decreasing width with increasing distance from the second surface S2, or in the first direction DR1.

For example, the inflow groove FH-1 may have a first width W1 near the second surface S2 and a second width W2, which is less than the first width W1, near the inclined surface SS, when measured in the second direction DR2.

In the present embodiment, the external air AR2 (e.g., see FIG. 4) may be more effectively supplied into the inflow groove FH-1.

Figure 7:
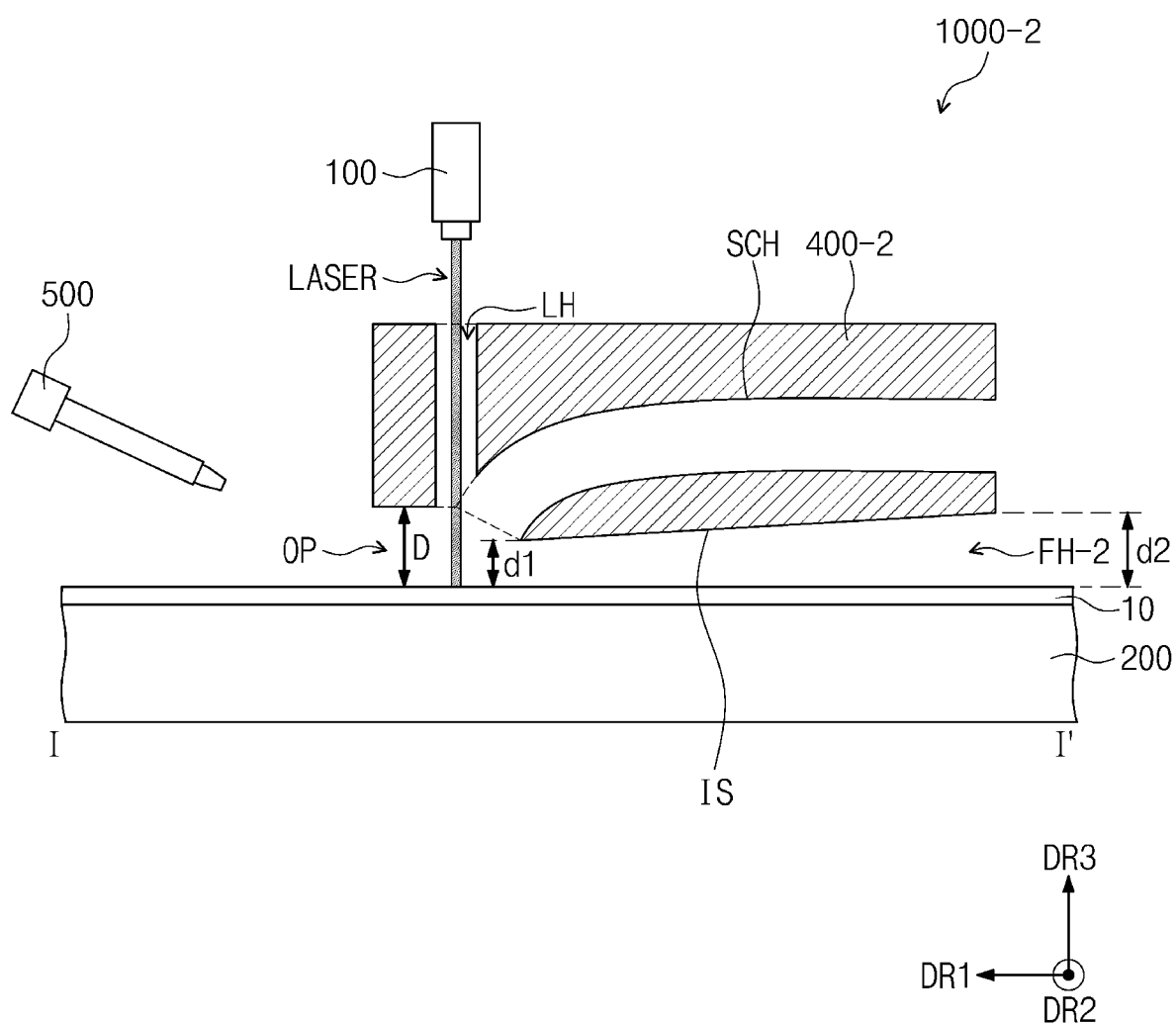
FIG. 7 is a cross-sectional view of the suction structure of FIG. 6.

FIG. 6 is a perspective view illustrating a bottom surface of a suction structure according to one or more embodiments of the inventive concept; and FIG. 7 is a cross-sectional view of the suction structure of FIG. 6.

For concise description, a previously described element may be identified by a similar or same reference number without repeating an overlapping description thereof. Other elements that are not separately described may be configured to have substantially the same technical features as those in the previously described embodiments.

Referring to FIGS. 6 and 7, an inflow groove FH-2 of a suction structure 400-2 according to one or more embodiments of the inventive concept may be provided to have a decreasing depth with increasing distance from the second surface S2, or in the first direction DR1. Here, the depth may be measured in the third direction DR3.

For example, the inflow groove FH-2 may have a first depth d1 near the inclined surface SS and a second depth d2, which is larger than the first depth d1, near the second surface S2, when measured in the third direction DR3.

In the present embodiment, the external air AR2 (e.g., see FIG. 4) may be more effectively supplied into the inflow groove FH-2.

Figure 8:
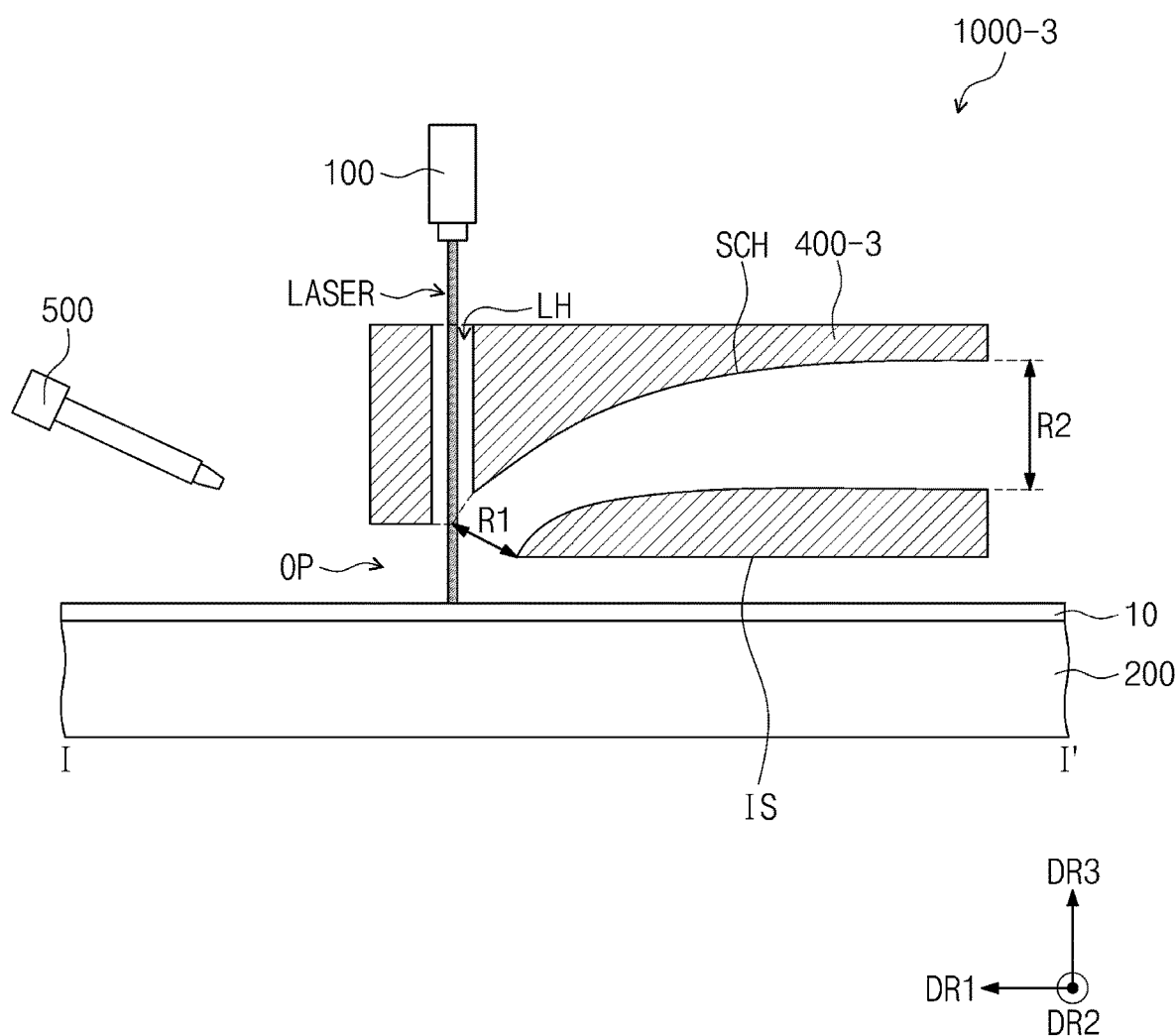
FIG. 8 is a cross-sectional view illustrating a laser processing apparatus according to one or more embodiments of the inventive concept.

FIG. 8 is a cross-sectional view illustrating a laser processing apparatus according to one or more embodiments of the inventive concept.

For concise description, a previously described element may be identified by a similar or same reference number without repeating an overlapping description thereof. Other elements that are not separately described may be configured to have same or substantially the same technical features as those of the previously described embodiments.

Referring to FIG. 8, a suction structure 400-3 of a laser processing apparatus 1000-3 may be provided to have a suction hole SCH having a cross-sectional area that increases in a direction from the inclined surface SS toward the second surface S2.

For example, the suction hole SCH may be provided to have a first cross-sectional width R1 near the inclined surface SS and a second cross-sectional width R2 near the second surface S2, and the second cross-sectional width R2 may be larger than the first cross-sectional width R1.

In the present embodiment, the air to be supplied into the suction structure 400-3 may be effectively exhausted to the suction unit 300 (e.g., see FIG. 1).

Figure 9:
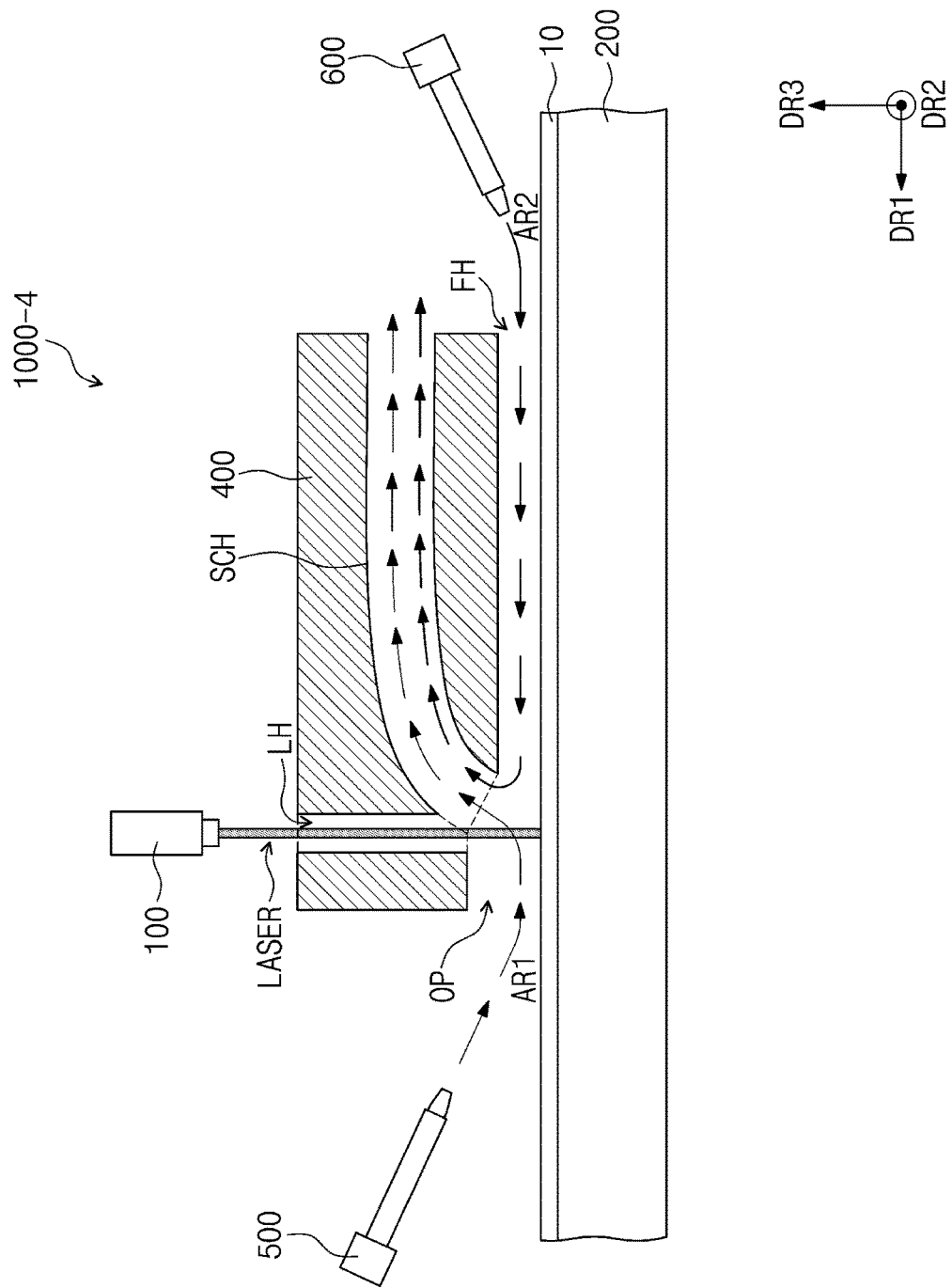
FIG. 9 is a cross-sectional view illustrating a laser processing apparatus according to one or more embodiments of the inventive concept.

FIG. 9 is a cross-sectional view illustrating a laser processing apparatus according to one or more embodiments of the inventive concept.

For concise description, a previously described element may be identified by a similar or same reference number without repeating an overlapping description thereof. Other elements that are not separately described may be configured to have same or substantially the same technical features as those of the previously described embodiments.

Referring to FIG. 9, a laser processing apparatus 1000-4, according to one or more embodiments of the inventive concept, may further include a guiding nozzle 600. The guiding nozzle 600 may be provided to face the supply nozzle 500 with the suction structure 400 interposed therebetween. In other words, the guiding nozzle 600, the suction structure 400, and the supply nozzle 500 may be sequentially arranged in the first direction DR1.

The guiding nozzle 600 may be provided to face the inflow groove FH and may be inclined at an angle relative to the top surface of the stage 200. Although not shown, the laser processing apparatus 1000-4 may further include an angle adjusting unit (not shown), which is connected to the guiding nozzle 600 and is used to adjust an angle of the guiding nozzle 600.

The supply nozzle 500 may be configured to eject the first air AR1 toward the opening OP. The first air AR1, which is supplied into the suction structure 400 through the opening OP, may be exhausted through the suction hole SCH.

The guiding nozzle 600 may be configured to eject the second air AR2 toward a guiding groove FH. The second air AR2, which is supplied into the suction structure 400 through the guiding groove FH, may be exhausted through the suction hole SCH.

In the present embodiment, it may be possible to more easily form the guiding air flow in the suction structure 400.

According to embodiments of the inventive concept, reliability of a laser processing apparatus may be improved.

While some example embodiments of the inventive concept have been particularly shown and described, it will be understood by one of ordinary skill in the art that variations in form and detail may be made therein without departing from the spirit and scope of the inventive concept, as set forth in the attached claims.

What is claimed is:

1. A laser processing apparatus comprising:
a laser generator configured to generate a laser beam;
a stage configured to support a target object thereon;
at least one supply nozzle over the stage to eject air toward the stage;
a suction unit configured to inhale external air; and
a suction structure over the stage and adjacent to the at least one supply nozzle, the suction structure having a suction hole, which is connected to the suction unit and through which the external air is inhaled,
wherein the suction structure comprises:
a bottom surface adjacent to the stage, the bottom surface including an inclined surface in which the suction hole is defined;
a top surface facing the bottom surface; and
a plurality of side surfaces connecting the bottom surface to the top surface,
wherein the plurality of side surfaces comprises a first surface adjacent to the at least one supply nozzle,
an opening is defined in a region of the first surface adjacent to the bottom surface, and
a distance between the inclined surface and the bottom surface is less than or equal to a height of the opening, and
wherein the suction structure defines a processing hole extending from the top surface toward the stage,
the laser generator is configured to generate the laser beam to propagate through the processing hole, and
the at least one supply nozzle is spaced apart from a region of the processing hole through which the laser beam is propagated and the opening and ejects air directly toward the opening.

2. The laser processing apparatus of claim 1, wherein the inclined surface is inclined at a first angle relative to a top surface of the stage.

3. The laser processing apparatus of claim 2, wherein the opening is connected to the bottom surface, and
the at least one supply nozzle is arranged to face the opening and is inclined at a second angle relative to the top surface of the stage.

4. The laser processing apparatus of claim 3, further comprising an angle adjusting unit connected to the at least one supply nozzle and configured to adjust the second angle.

5. The laser processing apparatus of claim 4, wherein the angle adjusting unit is connected to the suction structure by a hinge.

6. The laser processing apparatus of claim 3, wherein the first angle is equal to the second angle.

7. The laser processing apparatus of claim 2, wherein the first angle is from about 15° to 60°.

8. The laser processing apparatus of claim 1, wherein the processing hole and the suction hole are connected to each other.

9. The laser processing apparatus of claim 1, wherein the processing hole is between the opening and the suction hole.

10. The laser processing apparatus of claim 1, wherein the plurality of side surfaces further comprises a second surface opposite the first surface in a first direction, and
the suction structure defines an inflow groove, which is recessed from the bottom surface toward the top surface and is extended from the second surface toward the first surface to connect the second surface to the inclined surface.

11. The laser processing apparatus of claim 10, wherein a distance between an inner side surface of the inflow groove and the target object is from about 100 μm to 1000 μm.

12. The laser processing apparatus of claim 11, wherein the distance between the inner side surface of the inflow groove and the target object is equal to a shortest distance between the suction hole and the target object.

13. The laser processing apparatus of claim 10, wherein the inflow groove has a quadrilateral shape, when viewed in a plan view relative to the stage.

14. The laser processing apparatus of claim 10, wherein a width of the inflow groove decreases with increasing distance from the second surface in the first direction.

15. The laser processing apparatus of claim 10, wherein a depth of the inflow groove decreases with increasing distance from the second surface in the first direction.

16. The laser processing apparatus of claim 10, further comprising a guiding nozzle, which is arranged over the stage to face the at least one supply nozzle with the suction structure therebetween and is configured to eject air toward the stage,
wherein the guiding nozzle is arranged to face the inflow groove and is inclined at an angle relative to a top surface of the stage.

17. The laser processing apparatus of claim 10, wherein a distance between the opening and the stage is larger than a distance between an inner side surface of the inflow groove and the stage.

18. A laser processing apparatus comprising:
a laser generator configured to generate a laser beam;
a stage configured to support a target object thereon;
at least one supply nozzle over the stage to eject air toward the stage;
a suction unit configured to inhale external air; and
a suction structure over the stage and adjacent to the at least one supply nozzle, the suction structure having a suction hole, which is connected to the suction unit and through which the external air is inhaled,
wherein the suction structure comprises:

a bottom surface adjacent to the stage, the bottom surface including an inclined surface in which the suction hole is defined;
a top surface facing the bottom surface; and
a plurality of side surfaces connecting the bottom surface to the top surface,
wherein the plurality of side surfaces comprises a first surface adjacent to the at least one supply nozzle,
an opening is defined in a region of the first surface adjacent to the bottom surface, and
a distance between the inclined surface and the bottom surface is less than or equal to a height of the opening,
wherein the suction structure defines a processing hole extending from the top surface toward the stage,
the laser generator is configured to generate the laser beam to propagate through the processing hole, and
the at least one supply nozzle is spaced apart from a region of the processing hole through which the laser beam is propagated and the opening and ejects air directly toward the opening, and
wherein the laser generator, the suction structure, and the at least one supply nozzle are configured to move together over the stage.

19. The laser processing apparatus of claim 1, wherein a cross-sectional area of the suction hole increases in a direction from the inclined surface toward the suction unit.

20. A laser processing apparatus comprising:
a stage configured to support a target object thereon;
a laser generator configured to irradiate a laser beam toward the stage;
a supply nozzle over the stage and configured to eject air toward the stage; and
a suction structure over the stage and adjacent to the supply nozzle, the suction structure having a suction hole through which external air is inhaled,
wherein an entrance of the suction hole is inclined at an angle relative to a top surface of the stage, and
wherein the suction structure defines a processing hole extending from a top surface of the suction structure toward the stage,
the laser generator is configured to generate the laser beam to propagate through the processing hole, and
the supply nozzle is spaced apart from a region of the processing hole through which the laser beam is propagated and the suction hole.

* * * * *